(12) United States Patent
Han et al.

(10) Patent No.: US 12,555,785 B2
(45) Date of Patent: Feb. 17, 2026

(54) POSITIVE ELECTRODE ACTIVE MATERIAL COMPRISING LITHIUM NICKEL-BASED OXIDE DOPED WITH DOPING ELEMENT, AND SECONDARY BATTERY COMPRISING THE SAME

(71) Applicant: LG Energy Solution, Ltd., Seoul (KR)

(72) Inventors: Jungmin Han, Daejeon (KR); Gi Beom Han, Daejeon (KR); Sang Wook Lee, Daejeon (KR); Hakyoon Kim, Seoul (KR); Sora Baek, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 725 days.

(21) Appl. No.: 17/431,901

(22) PCT Filed: Sep. 22, 2020

(86) PCT No.: PCT/KR2020/012792
§ 371 (c)(1),
(2) Date: Aug. 18, 2021

(87) PCT Pub. No.: WO2021/107363
PCT Pub. Date: Jun. 3, 2021

(65) Prior Publication Data
US 2022/0149367 A1    May 12, 2022

(30) Foreign Application Priority Data

Nov. 27, 2019  (KR) .......... 10-2019-0154435
Sep. 15, 2020  (KR) .......... 10-2020-0118542

(51) Int. Cl.
H01M 4/525    (2010.01)
H01M 4/02     (2006.01)
H01M 4/505    (2010.01)
H01M 10/0525  (2010.01)

(52) U.S. Cl.
CPC .......... H01M 4/525 (2013.01); H01M 4/505 (2013.01); H01M 10/0525 (2013.01); H01M 2004/028 (2013.01); H01M 2220/20 (2013.01)

(58) Field of Classification Search
CPC ........ H01M 4/485; H01M 4/50; H01M 4/505; H01M 4/52; H01M 4/525; H01M 4/48–5825; H01M 4/00–98
See application file for complete search history.

(56) References Cited

U.S. PATENT DOCUMENTS

| | | | |
|---|---|---|---|
| 8,703,337 B2 | 4/2014 | Ellenwood et al. | |
| 2003/0138699 A1 | 7/2003 | Kweon et al. | |
| 2003/0211235 A1 | 11/2003 | Suh et al. | |
| 2014/0178739 A1 | 6/2014 | Jung | |
| 2015/0280211 A1 | 10/2015 | Kikuya et al. | |
| 2018/0316005 A1 | 11/2018 | Shin et al. | |
| 2019/0088938 A1 | 3/2019 | Zheng et al. | |
| 2019/0348674 A1 | 11/2019 | Hojberg et al. | |
| 2020/0020941 A1 | 1/2020 | Mizawa et al. | |
| 2020/0106095 A1 | 4/2020 | Nam et al. | |
| 2020/0388842 A1 | 12/2020 | Choi et al. | |
| 2022/0263086 A1* | 8/2022 | Lin ............ | H01M 4/0404 |

FOREIGN PATENT DOCUMENTS

| | | | |
|---|---|---|---|
| CN | 105609715 A | | 5/2016 |
| CN | 106229489 A | | 12/2016 |
| CN | 106558697 A | | 4/2017 |
| CN | 113292114 A | * | 8/2021 |
| EP | 3761415 A1 | | 1/2021 |
| JP | 2003217572 A | | 7/2003 |
| JP | 4524339 B2 | | 8/2010 |
| JP | 2012014851 A | | 1/2012 |
| KR | 20120029441 A | | 3/2012 |
| KR | 20140081472 A | | 7/2014 |
| KR | 20150060027 A | | 6/2015 |
| KR | 101534896 B1 | | 7/2015 |
| KR | 20170117541 A | | 10/2017 |
| KR | 20170143037 A | | 12/2017 |
| KR | 20180067775 A | | 6/2018 |
| KR | 20180125104 A | | 11/2018 |
| KR | 20190027613 A | | 3/2019 |

(Continued)

OTHER PUBLICATIONS

Machine translation of CN-113292114-A (Year: 2021).*
Li, G. et al., Understanding the Trace Ti Surface Doping on Promoting the Low Temperature Performance of LiNi1/3Co1/3Mn1/3O2 Cathode, Journal of Power Sources, Elsevier Amsterdam, Jan. 2015, pp. 69-76, vol. 281.
Extended European Search Report including Written Opinion for Application No. 20893411.7 dated May 10, 2022, pp. 1-7.
International Search Report for Application No. PCT/KR2020/012792, mailing Jan. 14, 2021, 2 pages.

(Continued)

Primary Examiner — Allison Bourke
(74) Attorney, Agent, or Firm — Lerner David LLP

(57) ABSTRACT

The present disclosure provides a positive electrode active material for a secondary battery, comprising: a lithium nickel-based oxide doped with a doping element (M'),
wherein the doping element (M') is at least one selected from the group consisting of titanium (Ti) and magnesium (Mg),
wherein when the doping element (M') is Ti, the doping content of Ti is 3000 ppm to 5000 ppm based on the total amount of the lithium nickel-based oxide excluding the doping element,
wherein when the doping element (M') is Mg, the doping content of Mg is 500 ppm to 5000 ppm based on the total amount of the lithium nickel-based oxide excluding the doping element, and
wherein when the doping element (M') is Ti and Mg, the total doping content of Ti and Mg is 3500 ppm to 5000 ppm based on the total amount of the lithium nickel oxide excluding the doping elements.

10 Claims, No Drawings

(56) References Cited

FOREIGN PATENT DOCUMENTS

| | | | |
|---|---|---|---|
| KR | 20190068292 | A | 6/2019 |
| KR | 20190128995 | A | 11/2019 |
| WO | 2014061654 | A1 | 4/2014 |
| WO | 2018179936 | A1 | 10/2018 |
| WO | 2019194510 | A1 | 10/2019 |

* cited by examiner

POSITIVE ELECTRODE ACTIVE MATERIAL COMPRISING LITHIUM NICKEL-BASED OXIDE DOPED WITH DOPING ELEMENT, AND SECONDARY BATTERY COMPRISING THE SAME

CROSS-REFERENCE TO RELATED APPLICATIONS

This application is a national stage entry under 35 U.S.C. § 371 of International Application No. PCT/KR2020/012792, filed on Sep. 22, 2020, which claims the benefit of Korean Patent Application No. 10-2019-0154435, filed on Nov. 27, 2019 and Korean Patent Application No. 10-2020-0118542, filed on Sep. 15, 2020 in the Korean Intellectual Property Office, the disclosures of which are incorporated herein by reference.

TECHNICAL FIELD

The present disclosure relates to a positive electrode active material including a lithium nickel-based oxide doped with a doping element, and a secondary battery including the same.

BACKGROUND ART

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high charge/discharge characteristics and lifetime characteristics and is environmentally friendly, and has been commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Currently, $LiCoO_2$, ternary system (NMC/NCA), $LiMnO_4$, $LiFePO_4$, etc. are used as a positive electrode material of a lithium secondary battery. Among them, in the case of $LiCoO_2$, there is a problem that a cost of cobalt is high and the capacity is low at the same voltage compared to the ternary system, and, thus, in order to increase the capacity of the secondary battery, a use of the ternary system having a high Ni content is gradually increasing.

Meanwhile, in the case of manufacturing a positive electrode using such a positive electrode material, a process of rolling an electrode is performed during the electrode process. In this case, in order to increase an electrode density of the positive electrode, a rolling density is enhanced.

However, when a pressure of the rolling is increased in order to increase the rolling density as described above, breakage of particles appears. In this case, as a specific surface area of the active material increases, a side reaction between an active material and an electrolyte is accelerated. Therefore, there is a problem that a large amount of gas is generated and lifespan characteristics are rapidly deteriorated.

Accordingly, there is an urgent need to develop a technology capable of solving the above-mentioned problems and preventing particle breakage even at high rolling pressure.

DETAILED DESCRIPTION OF THE INVENTION

Technical Problem

The present disclosure has been designed to solve the above-mentioned problems, and a object of the present disclosure is to provide a positive electrode active material which can minimize breakage even during rolling under high pressure to prevent side reactions of an electrolyte due to an increase in the specific surface area of the positive electrode active material, thereby improving lifespan characteristics while solving the problem of gas generation and increase in resistance during high temperature storage, and a secondary battery including the same.

Technical Solution

It should be understood that the terms and wordings used herein should not be construed to be limited to general or lexical means and the concepts of the terms may be defined to describe the invention made by the inventor(s) of the present disclosure the best way, and moreover the terms and wordings should be constructed to have meanings and concepts that agree with the technical spirit of the present disclosure.

Hereinafter, a positive electrode active material according to one embodiment of the present disclosure and a secondary battery including the same will be described.

According to one embodiment of the present disclosure, there is provided a positive electrode active material for a secondary battery, comprising: a lithium nickel-based oxide doped with a doping element (M'),
  wherein the doping element (M') is at least one selected from the group consisting of titanium (Ti) and magnesium (Mg),
  wherein when the doping element (M') is Ti, the doping content is 3000 ppm to 5000 ppm based on the total amount of the lithium nickel-based oxide excluding the doping element,
  wherein when the doping element (M') is Mg, the doping content is 500 ppm to 5000 ppm based on the total amount of the lithium nickel-based oxide excluding the doping element, and
  wherein when the doping element (M') is Ti and Mg, the total doping content is 3500 ppm to 5000 ppm based on the total amount of the lithium nickel oxide excluding the doping elements.

Specifically, when the doping element (M') is Ti, the doping content of Ti may be in the above range based on the total amount of the lithium nickel-based oxide excluding the doping element, and in particular, it may be 3000 ppm to 4000 ppm.

Alternatively, when the doping element (M') is Mg, the doping content of Mg may be in the above range based on the total amount of the lithium nickel-based oxide excluding the doping element, and specifically may be 2000 ppm to 4000 ppm.

Alternatively, when the doping element (M') is Ti and Mg, the total doping content may be in the above range based on the total amount of the lithium nickel-based oxide excluding the doping elements, and specifically may be 4000 ppm to 5000 ppm. In addition, a ratio of the doping content of Ti and Mg may be 1:9 to 9:1, and specifically 5:5 to 9:1 based on the weight.

The doped lithium nickel-based oxide may be a positive electrode active material for a secondary battery represented by the following Chemical Formula 1:

$$Li_aNi_{1-x-y-z}Co_xM_yM'_zO_{2-w}A_w \quad (1)$$

in the above formula,

M is at least one selected from the group consisting of Mn and Al,

M' is at least one selected from the group consisting of Ti and Mg,

A is an oxygen-substituted halogen, $1.00 \leq a \leq 1.5$, $0 < x < y$, $0.2 \leq x+y \leq 0.4$, and $0 \leq w \leq 0.001$, and the z is determined according to the content defined in claim 1 depending on the doping element.

Specifically, it may be a positive electrode active material for a secondary battery represented by the following Chemical Formula 2 essentially including Mn as M:

$$Li_aNi_{1-x-y-z}Co_x(Mn_sAl_t)_yM'_zO_{2-w}A_w \quad (2)$$

in the above formula,

M' is at least one selected from the group consisting of Ti and Mg,

A is an oxygen-substituted halogen, $1.00 \leq a \leq 1.5$, $0 < x < y$, $0.2 \leq x+y \leq 0.4$, $0 < s \leq 1$, $0 \leq t < 1$, and $0 \leq w \leq 0.001$, and the z is determined according to the content defined in claim 1 depending on the doping element.

Meanwhile, according to another embodiment of the present disclosure, there is provided a positive electrode comprising the positive electrode active material.

In addition, there is provided a secondary battery having a structure in which an electrode assembly including the above positive electrode, a negative electrode and a separator interposed between the positive electrode and the negative electrode is embedded in a battery case in a state of being impregnated with an electrolyte.

DETAILED DESCRIPTION OF THE EMBODIMENTS

Hereinafter, the present disclosure will be described in more detail.

According to one embodiment of the present disclosure, there is provided a positive electrode active material for a secondary battery, comprising: a lithium nickel-based oxide doped with a doping element (M'), wherein the doping element (M') is at least one selected from the group consisting of titanium (Ti) and magnesium (Mg), wherein when the doping element (M') is Ti, the doping content is 3000 ppm to 5000 ppm based on the total amount of the lithium nickel-based oxide excluding the doping element, wherein when the doping element (M') is Mg, the doping content is 500 ppm to 5000 ppm based on the total amount of the lithium nickel-based oxide excluding the doping element, and wherein when the doping element (M') is Ti and Mg, the total doping content is 3500 ppm to 5000 ppm based on the total amount of the lithium nickel oxide excluding the doping elements.

That is, the doping content of the doping element (M') for exhibiting the effects of the present disclosure is determined depending on which doping element is doped.

In other words, it depends on whether the doping element is titanium (Ti) alone, magnesium (Mg) alone, or both titanium (Ti) and magnesium (Mg) are doped.

Particularly, when the doping element (M') is Ti, the doping content may be 3000 ppm to 5000 ppm, and specifically 3000 ppm to 4000 ppm, based on the total amount of the lithium nickel-based oxide excluding the doping element.

When the doping element (M') is Mg, the doping content may be 500 ppm to 5000 ppm, specifically 1000 ppm to 5000 ppm, more specifically 2000 ppm to 4000 ppm based on the total amount of the lithium nickel-based oxide excluding the doping element.

Alternatively, when the doping element (M') is Ti and Mg, the total doping content may be 3500 ppm to 5000 ppm, and specifically 4000 ppm to 5000 ppm based on the total amount of the lithium nickel-based oxide excluding the doping element.

If the doping content is too small outside the above range, the effect of the present disclosure for preventing particle breakage of the positive electrode active material cannot be obtained, whereas if it is too much, it is not preferable because particle breakage may rather easily occur due to a decrease in the stability of the crystal structure of the lithium nickel-based oxide decreases by the doping element.

Meanwhile, as a result of repeated in-depth research by the present inventors, it was found that the doping element (M') is most preferably Ti, and preferably contains at least Ti.

In particular, conventionally, although various elements have been disclosed as the doping elements, when too much doping elements are required, it causes an increase in the manufacturing cost, and affects the properties originally exhibited by the lithium nickel-based oxides having high nickel content, which are not preferable. That is, the doping amount for preventing particle breakage while not affecting the properties of the lithium nickel-based oxide itself is most preferably within the above range. Nevertheless, some doping elements have a problem that a large doping amount is required in order to exhibit the effect of preventing particle breakage, while Ti is an element which exhibits most excellently the effect of preventing particle breakage when the above range is satisfied.

However, in the case of Mg, there is a limit to the improvement of particle breakage compared to Ti, but the effect of improving particle breakage is exhibited even with a smaller doping amount. Therefore, when it is desired to exhibit the effect with a smaller amount, it is preferable to use Mg.

For this reason, when both Ti and Mg are included as the doping element (M'), the content ratio thereof may be 1:9 to 9:1 based on the weight, and specifically, may be 5:5 to 9:1 since Ti exhibits the most desirable effect of improving particle breakage.

Meanwhile, specifically, the lithium nickel-based oxide according to the present disclosure may be represented by the following Chemical Formula 1:

$$Li_aNi_{1-x-y-z}Co_xM_yM'_zO_{2-w}A_w \quad (1)$$

In the above formula,

M is at least one selected from the group consisting of Mn and Al,

M' is at least one selected from the group consisting of Ti and Mg,

A is an oxygen-substituted halogen, $1.00 \le a \le 1.5$, $0 < x < y$, $0.2 \le x+y \le 0.4$, and $0 \le w \le 0.001$, and the z is determined according to the content defined in claim 1 depending on the doping element.

Specifically, the lithium nickel-based oxide according to the present disclosure may be a lithium transition metal oxide which essentially contains Ni and Co and essentially contains at least one element of Mn and Al.

Further, the lithium transition metal oxide may be doped with Ti and/or Mg.

More specifically, the lithium nickel-based oxide may be represented by the following Chemical Formula 2 essentially including Ni, Co and Mn:

$$Li_aNi_{1-x-y-z}Co_x(Mn_sAl_t)_yM'_zO_{2-w}A_w \quad (2)$$

in the above formula,

M' is at least one selected from the group consisting of Ti and Mg,

A is an oxygen-substituted halogen, $1.00 \le a \le 1.5$, $0 < x < y$, $0.2 \le x+y \le 0.4$, $0 < s \le 1$, $0 \le t < 1$, and $0 \le w \le 0.001$, and the z is determined according to the content defined in claim 1 depending on the doping element.

When using the active material as described above, the effect of improving particle breakage due to the doping of the element limited by the present disclosure is the most excellent.

The doped lithium nickel-based oxide can be prepared by any method without being limited as long as it is a conventional method of doping by adding a doping element to a lithium transition metal oxide. For example, it can be produced by preparing a Ni—Co-M precursor and then mixing and heat treating it with a lithium precursor and a doping (M') precursor, or by preparing a lithium nickel-based oxide not containing a doping element and then mixing and heat treating it with a doping precursor. Specifically, it can be prepared by preparing a Ni—Co-M precursor and then mixing and heat treating it with a lithium precursor and a doping (M') precursor.

Meanwhile, according to another embodiment of the present disclosure, there is provided a positive electrode including the positive electrode active material, and further, a secondary battery having a structure in which an electrode assembly including the above positive electrode, a negative electrode and a separator interposed between the positive electrode and the negative electrode is embedded in a battery case while being impregnated with an electrolyte.

Specifically, the secondary battery may be a lithium secondary battery.

In addition to the lithium nickel-based oxide, the positive electrode active material includes $LiNiO_2$, $LiMnO_2$, $LiMn_2O_2$, $Li(Ni_aCo_bMn_c)O_2$ ($0<a<0.8$, $0<b<1$, $0<c<1$, $a+b+c=1$), $LiNi_{1-d}Co_dO_2$, $LiCo_{1-d}Mn_dO_2$, $LiNi_{1-d}Mn_dO_2$ ($0.2<d<1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ ($0<e<2$), $LiCoPO_4$, $LiFePO_4$, or the like, and of course, any one or a mixture of two or more of them may be further included in a small amount.

However, the lithium nickel-based oxide may be included in an amount of 60% by weight or more based on the total weight of the positive electrode active material.

The positive electrode is formed by applying a positive electrode material including a conductive material, a binder and if necessary, a filler, in addition to the positive electrode active material, on a positive electrode current collector.

The conductive material is used to impart conductivity to the electrode, and in the battery to be configured, can be used without particular limitation as long as it does not cause chemical changes and has electronic conductivity. Particular examples include carbon-based materials such as carbon black, acetylene black, ketjen black, channel black, furnace black, lamp black, thermal black and carbon fiber; graphite such as natural graphite and artificial graphite; metal powder or metal fibers such as copper, nickel, aluminum and silver; conductive whiskey such as zinc oxide and potassium titanate; conductive metal oxides such as titanium oxide; or a conductive polymer such as a polyphenylene derivative. Any one alone or a mixture of two or more of them may be used. The conductive material may be included in an amount of 1% to 30% by weight, specifically 1% to 10% by weight, more specifically 1% to 5% by weight based on the total weight of the positive electrode material.

The binder plays a role of improving adhesion between the positive electrode active material particles and adhesive strength between the positive electrode active material and the current collector. Specific examples include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, recycled cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used. The binder may be included in an amount of 1% to 30% by weight, specifically 1% to 10% by weight, more specifically 1% to 5% by weight based on the total weight of the positive electrode material.

The positive electrode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, etc. may be used. In addition, the positive electrode current collector may have a thickness of 3 μm to 500 μm, and may have fine irregularities formed on the surface thereof to increase the adhesion of the positive electrode active material. For example, it may be used in various forms such as films, sheets, foils, nets, porous bodies, foams, and nonwoven fabrics.

The negative electrode may also be manufactured in a form in which a negative electrode material including a negative electrode active material is applied on a negative electrode current collector, and the negative electrode material may further include a conductive material, a binder and if necessary, a filler as described above, together with a negative electrode active material.

As the negative electrode active material, a compound capable of reversibly intercalating and deintercalating lithium may be used. Specific examples thereof may include carbonaceous materials such as artificial graphite, natural graphite, graphitized carbon fibers and amorphous carbon; metallic compounds capable of alloying with lithium, such as Si, Al, Sn, Pb, Zn, Bi, In, Mg, Ga, Cd, Si alloy, Sn alloy or Al alloy; metal oxides capable of doping and undoping lithium, such as $SiO_x$ (0<x<2), $SnO_2$, vanadium oxide and lithium vanadium oxide; or a composite including the above metallic compound and the carbonaceous material such as a Si—C composite or a Sn—C composite, or the like, and any one or a mixture of two or more of them may be used. In addition, a metal lithium thin film may be used as the negative electrode active material. Further, both low crystalline carbon and high crystalline carbon may be used as the carbon material. Typical examples of the low crystalline carbon may be soft carbon and hard carbon. Typical examples of the high crystalline carbon may be amorphous, planar, flaky, spherical or fibrous natural or artificial graphite, Kish graphite, pyrolytic carbon, mesophase pitch based carbon fiber, meso-carbon microbeads, mesophase pitches, and high-temperature calcined carbon such as petroleum or coal tar pitch derived cokes.

The negative electrode current collector is not particularly limited as long as it has high conductivity without causing chemical changes to the battery. For example, copper, stainless steel, aluminum, nickel, titanium, calcined carbon, copper or stainless steel having a surface treated with carbon, nickel, titanium, silver, etc., aluminum-cadmium alloy, and the like may be used. In addition, the negative electrode current collector may generally have a thickness of 3 μm to 500 μm, and, like the positive electrode current collector, may have fine irregularities formed on the surface thereof to enhance the bonding strength of the negative electrode active material. For example, it may be used in various forms such as films, sheets, foils, nets, porous bodies, foams and nonwoven fabrics.

The separator separates the negative electrode and the positive electrode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure having two or more layers thereof may be used. In addition, a conventional porous nonwoven fabric, for example, a nonwoven fabric made of high melting point glass fiber, polyethylene terephthalate fiber, or the like may also be used. In addition, in order to secure heat resistance or mechanical strength, a coated separator containing a ceramic component or a polymer material may be used, and optionally, a single layer or a multilayer structure may be used.

In addition, the electrolyte used in the present disclosure may include, but is not limited to, an organic liquid electrolyte, an inorganic liquid electrolyte, a solid polymer electrolyte, a gel polymer electrolyte, a solid inorganic electrolyte, a molten inorganic electrolyte or the like which can be used in the preparation of a lithium secondary battery.

Specifically, the electrolyte may include an organic solvent and a lithium salt.

As the organic solvent, any solvent may be used without particular limitation as long as it can serve as a medium through which ions involved in the electrochemical reaction of the battery can move. Specifically, as the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethylcarbonate (DEC), methylethylcarbonate (MEC), ethylmethylcarbonate (EMC), ethylene carbonate (EC), or propylene carbonate (PC); an alcohol-based solvent such as ethyl alcohol or isopropyl alcohol; nitriles such as R—CN (R is a straight, branched or cyclic C2-C20 hydrocarbon group, and may include a double-bond aromatic ring or ether bond); amides such as dimethylformamide; dioxolanes such as 1,3-dioxolane; or sulfolanes may be used. Among them, the carbonate-based solvent is preferable, and a mixture of a cyclic carbonate (e.g., ethylene carbonate, propylene carbonate, etc.) having high ionic conductivity and a high-dielectric constant, which may increase charge/discharge performance of the battery, and a low-viscosity linear carbonate-based compound (e.g., ethyl methyl carbonate, dimethyl carbonate, diethyl carbonate, etc.) may be more preferably used. In this case, when the cyclic carbonate and the chain carbonate are mixed and used in a volume ratio of about 1:1 to about 1:9, the electrolyte may exhibit excellent performance.

The lithium salt may be used without particular limitation as long as it is a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. It is preferable to use the lithium salt in a concentration rage of 0.1 to 2.0 M. If the concentration of the lithium salt is within the above range, since the electrolyte has an appropriate conductivity and viscosity, excellent electrolyte performance can be exhibited, and lithium ions can effectively move.

In order to improve the lifespan characteristics of the battery, suppress a reduction in battery capacity and improve discharge capacity of the battery, for example, one or more additives such as a halo-alkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinones, N,N-substituted imidazolidine, ethylene glycol dialkyl ether, an ammonium salt, pyrrole, 2-methoxy ethanol, or aluminum trichloride may be further added to the electrolyte in addition to the above electrolyte components. In this case, the additive may be included in an amount of 0.1% to 5% by weight based on the total weight of the electrolyte.

The secondary battery according to the present disclosure as described above may be used as a power source of devices in portable devices such as mobile phones, notebook computers, digital cameras, and electric vehicles such as hybrid electric vehicles (HEVs).

Hereinafter, embodiments of the present disclosure will be described in detail so that those skilled in the art can easily implement them. The present disclosure may be modified in various different ways, and is not limited to the embodiments forth herein.

Comparative Example 1

$NiSO_4 \cdot 6H_2O$ as a nickel precursor, $CoSO_4 \cdot 7H_2O$ as a cobalt precursor, and $MnSO_4 \cdot H_2O$ as a manganese precursor were used and mixed in distilled water at a Ni:Co:Mn molar ratio of 65:15:20 to prepare a metal salt aqueous solution, which was charged into a supply tank of a co-precipitation reactor (capacity 20 L, output of a rotary motor 200 W).

3 liters of distilled water was added to the co-precipitation reactor, and then dissolved oxygen was removed while supplying nitrogen gas at a rate of 2 liters/minute, and the reactor was stirred at 140 rpm while maintaining the temperature thereof at 50° C.

In addition, $NH_4(OH)$ having a concentration of 14M as a chelating agent, and a NaOH solution having a concentration of 8M as a pH adjuster were continuously added to the reactor at 0.06 liters/hour and 0.1 liters/hour, respectively, but the added amounts were properly controlled so that a pH in the reactor was maintained at 12 during the process.

Then, while the metal salt solution was added from the supply tank of the metal salt solution at 0.4 liters/hour, the impeller speed of the reactor was adjusted to 140 rpm to perform a co-precipitation reaction.

Subsequently, the obtained precipitate was filtered, washed with water, and dried in an oven at 100° C. for 24 hours to prepare hydrate precursor particles of $Ni_{0.65}Co_{0.15}Mn_{0.20}(OH)_2$.

Thereafter, $TiO_2$ was dry mixed with the hydrate precursor particles so that the lithium precursor (LiOH) to the hydrate precursor particle is 1:1, and Ti is 1000 ppm with respect to the weight of the positive electrode active material excluding the doping element, and the mixture was charged into a furnace and calcined at 850° C. for 10 hours to prepare a Ti-doped positive electrode active material of $LiNi_{0.648}Co_{0.15}Mn_{0.20}Ti_{0.002}O_2$.

Example 1

A positive electrode active material was prepared in the same manner as in Example 1, except that $LiNi_{0.644}Co_{0.15}Mn_{0.20}Ti_{0.006}O_2$ was prepared by dry mixing $TiO_2$ as a doping precursor in Example 1 so that Ti was 3000 ppm with respect to the weight of the positive electrode active material excluding the doping element.

Example 2

A positive electrode active material was prepared in the same manner as in Example 1, except that $LiNi_{0.64}Co_{0.15}Mn_{0.20}Ti_{0.01}O_2$ was prepared by dry mixing $TiO_2$ as a doping precursor in Example 1 so that Ti was 5000 ppm with respect to the weight of the positive electrode active material excluding the doping element.

Example 3

A positive electrode active material was prepared in the same manner as in Example 1, except that $LiNi_{0.646}Co_{0.15}Mn_{0.20}Mg_{0.004}O_2$ was prepared by dry mixing MgO as a doping precursor in Example 1 so that Mg was 1000 ppm with respect to the weight of the positive electrode active material excluding the doping element.

Example 4

A positive electrode active material was prepared in the same manner as in Example 1, except that $LiNi_{0.642}Co_{0.15}Mn_{0.20}Mg_{0.008}O_2$ was prepared by dry mixing MgO as a doping precursor in Example 1 so that Mg was 2000 ppm with respect to the weight of the positive electrode active material excluding the doping element.

Example 5

A positive electrode active material was prepared in the same manner as in Example 1, except that $LiNi_{0.634}Co_{0.15}Mn_{0.20}Mg_{0.016}O_2$ was prepared by dry mixing MgO as a doping precursor in Example 1 so that Mg was 4000 ppm with respect to the weight of the positive electrode active material excluding the doping element.

Comparative Example 2

A positive electrode active material was prepared in the same manner as in Example 1, except that $LiNi_{0.64}Co_{0.15}Mn_{0.20}Ti_{0.002}Mg_{0.008}O_2$ was prepared by dry mixing $TiO_2$ and MgO as a doping precursor in Example 1 so that Ti and Mg was 1000 ppm and 2000 ppm with respect to the weight of the positive electrode active material excluding the doping element, respectively.

Example 6

A positive electrode active material was prepared in the same manner as in Example 1, except that $LiNi_{0.641}Co_{0.15}Mn_{0.20}Ti_{0.005}Mg_{0.004}O_2$ was prepared by dry mixing $TiO_2$ and MgO as a doping precursor in Example 1 so that Ti and Mg was 2500 ppm and 1000 ppm with respect to the weight of the positive electrode active material excluding the doping element, respectively.

Example 7

A positive electrode active material was prepared in the same manner as in Example 1, except that $LiNi_{0.637}Co_{0.15}Mn_{0.20}Ti_{0.007}Mg_{0.006}O_2$ was prepared by dry mixing $TiO_2$ and MgO as a doping precursor in Example 1 so that Ti and Mg was 3500 ppm and 1500 ppm with respect to the weight of the positive electrode active material excluding the doping element, respectively.

Example 8

A positive electrode active material of $LiNi_{0.646}Co_{0.15}Al_{0.2}Ti_{0.004}O_2$ was prepared in the same manner as in Example 1, except that $Al_2(SO_4)_3 \cdot H_2O$ as an aluminum precursor instead of the manganese precursor is used, and Ni:Co:Al is mixed in a molar ratio of 65:15:20 to prepare a hydrate precursor particle of $Ni_{0.65}Co_{0.15}Al_{0.20}(OH)_2$.

Comparative Example 3

A positive electrode active material was prepared in the same manner as in Example 1, except that $LiNi_{0.6491}Co_{0.15}Mn_{0.20}Ti_{0.0009}O_2$ was prepared by dry mixing $TiO_2$ as a doping precursor in Example 1 so that Ti was 450 ppm with respect to the weight of the positive electrode active material excluding the doping element.

Comparative Example 4

A positive electrode active material was prepared in the same manner as in Example 1, except that $LiNi_{0.639}Co_{0.15}Mn_{0.20}Ti_{0.011}O_2$ was prepared by dry mixing $TiO_2$ as a doping precursor in Example 1 so that Ti was 5500 ppm with respect to the weight of the positive electrode active material excluding the doping element.

Comparative Example 5

A positive electrode active material was prepared in the same manner as in Example 1, except that $LiNi_{0.648}Co_{0.15}Mn_{0.20}Mg_{0.002}O_2$ was prepared by dry mixing MgO as a doping precursor in Example 1 so that Mg was 450 ppm with respect to the weight of the positive electrode active material excluding the doping element.

Comparative Example 6

A positive electrode active material was prepared in the same manner as in Example 1, except that $LiNi_{0.628}Co_{0.15}Mn_{0.20}Mg_{0.022}O_2$ was prepared by dry mixing MgO as a doping precursor in Example 1 so that Mg was 5500 ppm with respect to the weight of the positive electrode active material excluding the doping element.

Comparative Example 7

A positive electrode active material was prepared in the same manner as in Example 1, except that $LiNi_{0.648}Co_{0.15}Mn_{0.20}Zr_{0.002}O_2$ was prepared by dry mixing $ZrO_2$ as a doping precursor in Example 1 so that Zr was 2000 ppm with respect to the weight of the positive electrode active material excluding the doping element.

Comparative Example 8

A positive electrode active material was prepared in the same manner as in Example 1, except that $LiNi_{0.646}Co_{0.15}Mn_{0.20}Zr_{0.004}O_2$ was prepared by dry mixing $ZrO_2$ as a doping precursor in Example 1 so that Zr was 4000 ppm with respect to the weight of the positive electrode active material excluding the doping element.

Experimental Example 1

The positive electrode active materials of Examples 1 to 8 and Comparative Examples 1 to 6 were charged into a sample holder and rolled up to 9 tons using a rolling density measuring equipment of Carver to measure a specific surface area before rolling (BET) and a specific surface area after rolling (BET), and the results are shown in Table 1 below.

The "specific surface area" is measured by the BET method, and specifically, is calculated from the amount of nitrogen gas adsorption under liquid nitrogen temperature (77K) using BELSORP-mino II of BEL Japan Company.

TABLE 1

| | $BET(m^2/g)(A)$ before rolling | $BET(m^2/g)(B)$ after rolling | BET increase rate(%) (B/A)*100 |
|---|---|---|---|
| Comparative Example 1 | 0.41 | 1.16 | 282.9 |
| Example 1 | 0.43 | 1.02 | 237.2 |
| Example 2 | 0.44 | 1.04 | 236.9 |
| Example 3 | 0.43 | 1.16 | 268.7 |
| Example 4 | 0.43 | 1.12 | 260.4 |
| Example 5 | 0.38 | 0.95 | 249.1 |
| Comparative Example 2 | 0.41 | 1.11 | 270.7 |
| Example 6 | 0.45 | 1.12 | 248.9 |
| Example 7 | 0.42 | 1.02 | 242.9 |
| Example 8 | 0.40 | 1.16 | 290.8 |
| Comparative Example 3 | 0.45 | 1.35 | 298.9 |
| Comparative Example 4 | 0.41 | 1.12 | 273.2 |
| Comparative Example 5 | 0.39 | 1.17 | 299.3 |
| Comparative Example 6 | 0.40 | 1.09 | 272.0 |
| Comparative Example 7 | 0.43 | 1.22 | 283.8 |
| Comparative Example 8 | 0.45 | 1.25 | 278.5 |

Referring to Table 1, it can be seen that when the same rolling was performed, the positive electrode active material according to the examples had less particle breakage than the positive electrode active material of the comparative examples.

Experimental Example 2

The positive electrode active materials prepared in Examples 1 to 8 and Comparative Examples 1 to 6 were used, and PVdF as a binder and natural graphite as a conductive material were used. The positive electrode active material, binder and conductive materials were mixed well in NMP in a weight ratio of 96:2:2, applied on an Al foil having a thickness of 20 μm, and dried at 130° C. to prepare a positive electrode. A lithium foil was used as a negative electrode, and an electrolyte containing 1M $LiPF_6$ in a solvent of EC:DMC:DEC=1:2:1 was used to prepare a half coin cell.

After the half coin cell was fully charged to 4.3V at 0.33 C, the cell was disassembled, and the positive electrode and the separator were washed in a dimethyl carbonate (DMC) solution and dried in the atmosphere. The dried positive electrode and the separator were inserted into an Al pouch, and the same electrolyte as above was newly injected, and then the pouch was vacuum-sealed to prepare a pouch for measuring the amount of gas generated. While storing the prepared pouch at a high temperature of 60° C. for 4 weeks, by using Archimedes' principle, the pouch was placed in a water tank containing a certain volume of distilled water to measure a mass in water, and a volume change of the pouch was calculated using a mass in the atmosphere and a density according to the temperature of the water during the measurement. The results of the measured generation amount of gas were shown in Table 2 below.

TABLE 2

| | Generation amount of gas (ml) |
|---|---|
| Comparative Example 1 | 0.341 |
| Example 1 | 0.242 |
| Example 2 | 0.245 |
| Example 3 | 0.322 |
| Example 4 | 0.291 |
| Example 5 | 0.276 |
| Comparative Example 2 | 0.335 |
| Example 6 | 0.261 |
| Example 7 | 0.255 |
| Example 8 | 0.444 |
| Comparative Example 3 | 0.472 |
| Comparative Example 4 | 0.35 |
| Comparative Example 5 | 0.471 |
| Comparative Example 6 | 0.351 |
| Comparative Example 7 | 0.418 |
| Comparative Example 8 | 0.389 |

Referring to Table 2, it can be seen that in the examples of the above Table 1 in which the particle breakage is less and thus as the BET change rate is less, the high-temperature storage performance is better.

Experimental Example 3

The half coin cell prepared in Experimental Example 2 above was charged to 4.3V at 1 C under constant current/constant voltage (CC/CV) conditions at 45° C., and then discharged to 3.0V at 1 C under a constant current (CC) condition, and the discharge capacity was taken as a 1-cycle discharge capacity. This was repeatedly carried out up to 400 cycles, and a value calculated from (capacity after 400 cycles/capacity after 1 cycle)×100 was taken as a high temperature lifespan retention rate (%), and the results are shown in Table 3.

TABLE 3

|  | Capacity retention rate (%) |
|---|---|
| Comparative Example 1 | 88.6 |
| Example 1 | 92.1 |
| Example 2 | 92 |
| Example 3 | 89 |
| Example 4 | 89.9 |
| Example 5 | 90.7 |
| Comparative Example 2 | 86.4 |
| Example 6 | 91.5 |
| Example 7 | 91.8 |
| Example 8 | 85.5 |
| Comparative Example 3 | 83.9 |
| Comparative Example 4 | 88.1 |
| Comparative Example 5 | 84.1 |
| Comparative Example 6 | 88.3 |
| Comparative Example 7 | 86.9 |
| Comparative Example 8 | 87.4 |

Referring to Table 3, it can be seen that in the examples of the above Table 1 in which the particle breakage is less and thus the BET change rate is less, the high-temperature lifespan characteristics is better.

INDUSTRIAL APPLICABILITY

The positive electrode active material according to the present disclosure can minimize particle breakage even during high pressure rolling by doping optimization including a specific doping element in a specific content, thereby solving an increase in resistance during high temperature storage according to gas generation due to increased side reactions with the electrolyte, which results from an increase in the specific surface area of the positive electrode active material, and further improving the lifespan characteristics.

The invention claimed is:

1. A positive electrode active material for a secondary battery, comprising:
a lithium nickel-based oxide doped with a doping element (M'),
wherein the doping element (M') is titanium (Ti) and magnesium (Mg), and a
total doping content is from 3500 ppm to 5000 ppm based on the total amount of the lithium nickel oxide excluding the doping elements, and
wherein the lithium nickel-based oxide is represented by the following Chemical Formula 1:

$$Li_aNi_{1-x-y-z}Co_xM_yM'_zO_{2-w}A_w \quad (1)$$

wherein,
M is at least one selected from the group consisting of Mn and Al,
M' is Ti and Mg,
A is an oxygen-substituted halogen,
$1.00 \leq a \leq 1.5$, $0 < x < y$, $0.2 \leq x+y \leq 0.4$, and $0 \leq w \leq 0.001$, and z is determined according to the doping content depending on the doping element.

2. The positive electrode active material for a secondary battery according to claim 1, wherein a ratio of the doping content of Ti and Mg is from 1:9 to 9:1 on a weight basis.

3. The positive electrode active material for a secondary battery according to claim 2, wherein the ratio of the doping content of Ti and Mg is from 5:5 to 9:1 on the weight basis.

4. A positive electrode active material for a secondary battery, comprising:
a lithium nickel-based oxide doped with a doping element (M'),
wherein the doping element (M') is titanium (Ti) and magnesium (Mg), and
a total doping content of Ti and Mg is from 4000 ppm to 5000 ppm based on the total amount of the lithium nickel oxide excluding the doping elements, wherein the lithium nickel-based oxide is represented by the following Chemical Formula 2:

$$Li_aNi_{1-x-y-z}Co_x(Mn_sAl_t)_yM'_zO_{2-w}A_w \quad (2), wherein$$

M' is Ti and Mg,
A is an oxygen-substituted halogen,
$1.00 < a \leq 1.5$, $0 < x < y$, $0.2 < x+y < 0.4$, $0 < s \leq 1$, $0 < t < 1$, and $0 \leq w \leq 0.001$, and the z is determined according to the doping content depending on the doping element.

5. A positive electrode comprising the positive electrode active material for a secondary battery according to claim 1.

6. A secondary battery comprising:
a battery case;
an electrode assembly comprising the positive electrode of claim 5, a negative electrode and a separator interposed between the positive electrode and the negative electrode; and
an electrolyte.

7. The positive electrode active material for a secondary battery according to claim 4, wherein the doping element (M') is Ti and Mg, and a ratio of the doping content of Ti and Mg is from 1:9 to 9:1 on a weight basis.

8. The positive electrode active material for a secondary battery according to claim 7, wherein the ratio of the doping content of Ti and Mg is from 5:5 to 9:1 on the weight basis.

9. A positive electrode comprising the positive electrode active material for a secondary battery according to claim 4.

10. A secondary battery comprising:
a battery case;
an electrode assembly comprising the positive electrode of claim 9, a negative electrode and a separator interposed between the positive electrode and the negative electrode; and
an electrolyte.

* * * * *